United States Patent
Copeland et al.

(10) Patent No.: US 11,361,594 B1
(45) Date of Patent: Jun. 14, 2022

(54) UTILIZATION OF FREE TIME IN AUTONOMOUS VEHICLES

(71) Applicant: Wells Fargo Bank, N.A., San Francisco, CA (US)

(72) Inventors: Jennifer L. Copeland, San Francisco, CA (US); Suzanne M. Fisi, Clayton, CA (US); Simone O. Harvey, Berkeley, CA (US); David C. Hatch, Pacifica, CA (US); Chris Kalaboukis, San Jose, CA (US); Muhammad Farukh Munir, Pittsburg, CA (US); Aaron Francis Colfax Petrik, Alameda, CA (US); Darrell L. Suen, San Ramon, CA (US); Timothy R. Ward, Mesa, AZ (US); Steven J. Wirt, Oakland, CA (US); Ryan J. Wyler, Gilbert, AZ (US); Nancy B. Zimmerman, Fairfax, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 597 days.

(21) Appl. No.: 15/597,355

(22) Filed: May 17, 2017

(51) Int. Cl.
*G07B 15/00* (2011.01)
*G01C 21/36* (2006.01)
*G05D 1/00* (2006.01)
*G06Q 10/04* (2012.01)
*G06Q 30/02* (2012.01)
(Continued)

(52) U.S. Cl.
CPC ......... *G07B 15/00* (2013.01); *G01C 21/3605* (2013.01); *G05D 1/0088* (2013.01); *G06Q 10/047* (2013.01); *G06Q 30/0208* (2013.01); *G06Q 50/30* (2013.01); *G07F 17/0057* (2013.01)

(58) Field of Classification Search
CPC .. G07B 15/00; G01C 21/3605; G05D 1/0088; G06Q 10/047; G06Q 30/0208; G06Q 50/30; G07F 17/0057
USPC .......................................................... 705/13
See application file for complete search history.

(56) References Cited

U.S. PATENT DOCUMENTS

| 5,973,619 | A | 10/1999 | Paredes |
| 6,356,838 | B1 | 3/2002 | Paul |
| 7,941,267 | B2 | 5/2011 | Adamczyk et al. |

(Continued)

FOREIGN PATENT DOCUMENTS

WO 2016082021 A1 6/2016

OTHER PUBLICATIONS

Piotrowski, Matt; "Increased Worker Productivity One More Benefit of Autonomy"; Sep. 16, 2016. (Year: 2016).*

(Continued)

*Primary Examiner* — Resha Desai
*Assistant Examiner* — Dione N. Simpson
(74) *Attorney, Agent, or Firm* — Merchant & Gould P.C.

(57) ABSTRACT

A method implemented on an electronic computing device for arranging activities for one or more individuals using an autonomous vehicle (AV) includes receiving a request from a first individual for the AV. An action is initiated to provide the AV to the first individual. One or more activities are provided for the first individual to perform during a trip using the AV. A detection is made as to when the first individual completes one of the one or more activities. A cost of the trip is adjusted based on a completion of the one of the one or more activities.

9 Claims, 6 Drawing Sheets (51) Int. Cl.
  *G06Q 50/30* (2012.01)
  *G07F 17/00* (2006.01)

(56) References Cited

U.S. PATENT DOCUMENTS

| | | | |
|---|---|---|---|
| 8,352,112 | B2 | 1/2013 | Mudalige |
| 8,630,897 | B1 | 1/2014 | Prada Gomez et al. |
| 9,171,268 | B1 | 10/2015 | Penilla et al. |
| 9,183,572 | B2 | 11/2015 | Brubaker |
| 9,459,622 | B2 | 10/2016 | Abhyanker |
| 2009/0049119 | A1* | 2/2009 | Marcinkiewicz ....... H04L 67/06 709/203 |
| 2010/0299207 | A1 | 11/2010 | Harlev et al. |
| 2011/0145048 | A1 | 6/2011 | Liu |
| 2011/0313880 | A1 | 12/2011 | Paul et al. |
| 2012/0323690 | A1 | 12/2012 | Michael |
| 2013/0226365 | A1 | 8/2013 | Brozovich |
| 2013/0321178 | A1 | 12/2013 | Jameel et al. |
| 2014/0279011 | A1 | 9/2014 | McMullen et al. |
| 2015/0170116 | A1 | 6/2015 | Amtmann |
| 2015/0215738 | A1 | 7/2015 | Frusina et al. |
| 2015/0248689 | A1* | 9/2015 | Paul ................... G06Q 30/0222 705/14.23 |
| 2015/0262239 | A1 | 9/2015 | Goralnick |
| 2015/0324708 | A1 | 11/2015 | Skipp et al. |
| 2015/0338852 | A1* | 11/2015 | Ramanujam ........... G01C 21/26 701/2 |
| 2015/0339928 | A1 | 11/2015 | Ramanujam |
| 2015/0348112 | A1 | 12/2015 | Ramanujam |
| 2016/0027115 | A1* | 1/2016 | Gonzalez Roman .. G06Q 40/06 705/26.5 |
| 2016/0027306 | A1* | 1/2016 | Lambert ............ G01C 21/3438 701/117 |
| 2016/0027307 | A1 | 1/2016 | Abhyanker et al. |
| 2016/0232565 | A1 | 8/2016 | Goergen |
| 2017/0011559 | A1* | 1/2017 | Graham ................. G07B 15/02 |
| 2017/0186315 | A1* | 6/2017 | Glasgow ............. G08G 1/0969 |
| 2017/0255994 | A1* | 9/2017 | Rieger ................. G06Q 40/025 |
| 2018/0007414 | A1* | 1/2018 | Li ....................... H04N 21/2668 |
| 2018/0089605 | A1* | 3/2018 | Poornachandran ......................... G06Q 30/0282 |
| 2018/0091604 | A1* | 3/2018 | Yamashita ............. G06Q 50/30 |
| 2018/0107216 | A1* | 4/2018 | Beaurepaire .......... B60W 50/08 |
| 2018/0137470 | A1* | 5/2018 | Donnelly ................ H04W 4/44 |
| 2019/0005544 | A1* | 1/2019 | Hong ................. G06Q 30/0265 |

OTHER PUBLICATIONS

Evarts, Eric C., "Why a Future Ride in a Self-Driving Car Could Be a Trip to Advertising Hell," http://www.alternet.org/media/why-future-ride-self-driving-car-could-be-trip-advertising-hell, Aug. 14, 2015, 7 pages.
Vugo, "Vugo reaches consumers with interactive content in rideshare vehicles like Uber and Lyft," http://www.govugo.com/advertise/, Oct. 17, 2016, 6 pages.
O'Reilly, Lara, "Uber drivers might soon earn $6,000 more per year—if they allow ads in their cars," http://www.businessinsider.com/viewswagen-in-car-ad-platform-to-launch-for-uber-and-lyft-drivers-2015-4, Apr. 15, 2015, 4 pages.
Robot Taxi, Inc., "Consider Robot Taxi your personal chauffeur," https://robottaxi.com/en/, Oct. 17, 2016, 8 pages.
Korosec, Kirsten, "Self-Driving Taxis Hit the Streets of Singapore," http://fortune.com/2016/08/25/self-driving-taxi-singapore/, Aug. 25, 2016, 8 pages.
Tully, Jim et al., "Internet of Things Primer for 2016," Mar. 31, 2016, 8 pages.
Velosa, Alfonso, et al., "Hype Cycle for the Internet of Things, 2016," Jul. 14, 2016, 68 pages.
Velosa, Alfonso et al., "Maturity Model for the Internet of Things," Mar. 2, 2016, 18 pages.
Tully, Jim, "IoT: Key Lessons to Date and Action Plan for 2016," Feb. 12, 2016, 8 pages.
Prentice, Stephen, "The Six Forces That Will Shape Business and Technology in 2030," Feb. 1, 2016, 9 pages.
Friedman, Ted et al., "Predicts 2016: Unexpected Implications Arising From the Internet of Things," Dec. 3, 2015, 13 pages.
Cearley, David W. et al., "Top 10 Strategic Technology Trends for 2016," Feb. 29, 2016, 15 pages.
Burke, Brian et al., "Top 10 Strategic Technology Trends for 2016: Internet of Things Architecture and Platforms," Feb. 19, 2016, 11 pages.
Cearley, David W. et al., "Top 10 Strategic Technology Trends for 2016: Ambient User Experience," Feb. 26, 2016, 11 pages.
Walker, Mike J. et al., "Top 10 Strategic Technology Trends for 2016: Information of Everything," Feb. 26, 2016, 11 pages.
Plummer, Daryl C. et al., "Top Strategic Predictions for 2016 and Beyond: The Future is a Digital Thing," Oct. 2, 2015, 27 pages.
Jones, Nick, "Top 10 IoT Technologies for 2017 and 2018," Jan. 22, 2016, 12 pages.
Geschickter, Chet et al., "Measuring the Strategic Value of the Internet of Things for Industries," Apr. 28, 2016, 14 pages.
Furlonger, David et al., "Toolkit: IoT Strategic Technology Map for Financial Services Initiatives," Dec. 2, 2015, 4 pages.
Furlonger, David et al., "Survey Analysis: Financial Services CIOs Should Not Ignore the Internet of Things," Mar. 17, 2015, 17 pages.
Moyer, Kristin R. et al., "Measuring the Strategic Value of Financial Services IoT," Dec. 2, 2015, 10 pages.
Newton, Alistair et al., "Gartner's Digital Banking Customer Advisory Framework," Jul. 7, 2016, 8 pages.
Moyer, Kristin R., "Industry Vision: Banks as Platforms," Apr. 22, 2016, 11 pages.
Moyer, Kristin R. et al., "Industry Vision: Tipping Point for Banks as Platforms," May 3, 2016, 11 pages.
Moyer, Kristin R., "The Economics of Connections for Banking," Mar. 8, 2016, 12 pages.
Geschickter, Chet et al., "Survey Analysis: Early Adopters of Internet of Things Poised to Make 2016 the Year of the Customer," Feb. 12, 2016, 15 pages.
Lehong, Hung et al., "Building a Digital Business Technology Platform," Jun. 8, 2016, 21 pages.

* cited by examiner

UTILIZATION OF FREE TIME IN AUTONOMOUS VEHICLES

BACKGROUND

An autonomous vehicle is a self-driving vehicle that can operate with little or no human control of the vehicle. A variety of techniques can be used to detect the surroundings of and navigate the autonomous vehicle. Techniques used to detect the surroundings of the autonomous vehicle can include radar, global positioning system (GPS) and computer vision. Advanced control systems can be used to interpret sensory data and to help navigate the autonomous vehicle.

Autonomous vehicles are being developed and typically require a driver in the vehicle that can immediately take control of the vehicle in an emergency. However, in the future, an expectation is that fully autonomous vehicles will become available that require little or no human input.

SUMMARY

Embodiments of the disclosure are directed to a method implemented on an electronic computing device for arranging activities for one or more individuals using an autonomous vehicle (AV), the method comprising: on the electronic computing device, receiving a request from a first individual for the AV; initiating an action to provide the AV to the first individual; providing one or more activities for the first individual to perform during a trip using the AV; detecting when the first individual completes one of the one or more activities; and adjusting a cost of the trip based on a completion of the one of the one or more activities.

In another aspect, a method implemented on an electronic computing device for arranging activities for a plurality of individuals using an autonomous vehicle (AV) comprises: on the electronic computing device, receiving a request to arrange a trip for the plurality of individuals to a common destination using the AV; initiating an action to direct the AV to one or more locations where each of the plurality of individuals can access the AV; after all of the plurality of individuals have entered the AV, initiate a focus group for the plurality of individuals in the AV; process responses from one of more of the plurality of individuals during the focus group; and when the AV reaches the common destination, adjust a cost for the trip for each of the plurality of individuals.

In yet another aspect, an electronic computing device comprises: a processing unit; and system memory, the system memory including instructions which, when executed by the processing unit, cause the electronic computing device to: receive a request from an individual for the AV; initiate an action to provide the AV to the individual; obtain a profile for the individual; monitor a trip for the individual using the AV, the monitoring the trip comprising determining geolocations of the AV during the trip; based on the profile of the individual, provide one or more activities for the individual to perform during the trip using the AV, at least one of the activities associated with a geolocation of the AV during the trip, at least one of the activities comprising providing feedback on advertising shown to the individual during the trip; provide an offer of compensation to the individual for changing a route to a destination of the individual in order to provide the individual more time to complete the one or more activities during the trip; detect when the individual completes one of the activities; and provide a financial reward based on a completion of the one of the activities, the financial reward comprising either reducing a fare for the AV or reducing a loan payment for the AV.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for productively using free time of passengers in an autonomous vehicle (AV). In the examples described herein, the AV is a vehicle that can transport an individual with little or no input from that individual during the transport.

In some examples, activities can be presented to the passengers to perform while in the AV. The activities can be consistent with a profile of the passengers. The activities can comprise small tasks, known as micro-tasks, which can be presented to a passenger. In addition, when a plurality of passengers ride together in the AV, a focus group comprising the passengers can be formed and the activities can be group activities than can be performed by the focus group. When an activity or plurality of activities is completed, the passengers can be given a financial incentive that can be used to offset a cost of the ride in the AV, that can be provided as a monetary credit, reward points or cash rewards or can that can be used for other purposes.

The AV is a self-driving vehicle that can be owned or rented by the passenger. The passenger can be a customer of an organization that can arrange trips in the AV for the passenger and for other passengers. The organization can maintain a profile of the passengers or can obtain the profile from one or more third party sources. Activities that can be presented to the passengers while in the AV can be based on profiles of the passengers and a personal calendar of the passengers.

The organization can be an organization such as a ride sharing service from which the customer can request individual usage of the AV or ride pooling in the AV with other individuals. The organization can also be a car rental company from which the user can rent the AV. The organization can also be a financial institution, such as a bank, that can have business agreements with the ride sharing service or car rental company or that can finance a purchase of the AV for the user. When the user finances the AV through the organization, completion of the activities can permit the financial institution to reduce a monthly loan payment that the user may have with the financial institution for the AV. Other organizations and other financial arrangements for the user with the organization regarding usage of the AV are possible.

The profiles of the customer can include information such as the customer's name, address, telephone number, email address, age, name and age of spouse, name and age of children, employer, job title and work address. The profile can also include customer preferences, such as whether the customer permits ride pooling with others. Other profile information is possible.

A plurality of activities can be provided to passengers based on the profile of the user. Some example activities can include presenting the passenger with micro-tasks that the passenger can complete for a credit, presenting advertising to the passenger for the user to view, initiating a focus group for the passenger with other passengers in the AV and implementing ride pooling for the passenger. Other activities are possible.

The micro-tasks can be small tasks that the passenger can complete while in the AV and that can be based on the profile of the passenger. Example micro-tasks can include reviewing documents, completing surveys, writing a short summary of a website and identifying items in images. Other micro-tasks are possible.

The passenger can receive micro-payments for completing the micro-tasks. In some implementations, when a balance of micro-payments reaches a certain amount, the micro-payments can be paid out to the passenger. The micro-payments can be paid out in variety of ways including cash, reward points, reduction of loan balances and credit toward a fare for a ride in the AV. Other ways in which the micro-tasks can be paid out are possible.

In some implementations, as the passenger enters the AV, an estimated time of arrival (ETA) to a trip destination can be calculated. Once the ETA is determined, a list of tasks can be presented to the passenger. The list of tasks can be optimized based on a time interval required to complete each task and the passenger's current knowledge set. The tasks can be considered micro-tasks because they are short in duration. Each of the micro-tasks can be assigned a monetary value that can be used to offset a cost of the trip using the AV. As a passenger progresses serially through each micro-task, an on-screen counter of a display screen in the AV can show the passenger a progression of the current fare as the trip in the AV proceeds to the destination. Upon the completion of one or more of the micro-tasks, the display screen can show a reduction in the current fare based on a fare credit for the completion of the one or more of the micro-tasks.

One or more of the micro-tasks can be location dependent and be specific to a geolocation of the AV. For example, one micro-task can be to estimate a number of people waiting to get into a popular restaurant. For this example, when the AV is about to pass the restaurant, the micro-task can be displayed to the passenger, possibly interrupting another micro-task the passenger is currently performing. The passenger can complete this micro-task by looking out the window of the AV, estimating the number of people waiting in line for the restaurant and reporting the results via a user interface on the display screen or via another electronic computing device of the passenger, such as a smartphone.

In addition, this micro-task can be tagged with the geo-location of the restaurant, so that any other passing vehicles can complete the micro-tasks as well. The micro-task can also be tagged for completion within a time period, so that the task is not performed repeatedly within the time period. In addition, tasks tagged with a geo-location can be chained to a series of vehicles that can pass through the geo-location and permit passengers of the vehicles to complete micro-tasks related to the geo-location when the vehicles pass through the geo-location. Furthermore, predetermined physical objects, for example billboards, can be identified for a trip route and a reaction can be requested from passengers in the AV regarding a physical object when the AV is at or near a geolocation of the physical object.

The micro-tasks can also include reviewing or responding to advertising presented to the passenger while in the AV. Particular advertisements that are presented to the passenger can be based on user background and interests obtained from a profile of the passenger. One or more advertisements can be presented to the passenger on a display screen of the AV. The passenger can respond to the advertisements via a user interface on the display screen. As the passenger responds to the advertisements, the passenger can earn a micro-credit that can be applied to a fare for the AV or can be used for other purposes.

The advertisements can also be keyed to a geolocation of the AV and can permit other functionality based on the geolocation of the AV. For example, as the AV passes a concert hall, the passenger can be shown a list of upcoming events for the concert hall and the passenger may be able to purchase tickets for the concert via the user interface on the display screen. In some implementations, the passenger's personal calendar can also be accessed and the passenger can be informed that a concert is available for the current evening that the passenger has time to attend.

Other functionality regarding micro-tasks can include permitting passenger to accept a micro-task and send the micro-task to another passenger for completion, permitting passengers in different vehicles to collaborate on completing a micro-task and permitting a passenger to accept a suggestion for a route change to enable the passenger more time to complete a micro-task. Other functionality regarding micro-tasks is possible.

Focus groups can permit a plurality of passengers in an AV to provide feedback collaboratively, rather than individually, during an execution of a micro-task. One or more of the plurality of passengers can enter the AV at different locations and can have different trip destinations. When a focus group is implemented in the AV, the plurality of passengers can be presented with a question, exercise or problem. The passengers can then collaborate and return a solution.

The user of focus groups can permit product marketers or advertisers to conduct small, ad-hoc groups based on a profile of the passengers in the AV. Example ad-hoc groups can include a group of millennials, a group of parents, a group of sports fans and other ad-hoc groups. The ad-hoc group can also include a randomly selected group of individuals. In addition, each focus group can be pre-selected based on a specific focus group product. The AV itself can also be configured a multi-passenger, multi-destination ride share and passengers can indicate a preference or a willingness to participate in multi-person focus groups and a preference to participate in ride sharing.

As an example of using a focus group in an AV, an organization can identify individuals, based on their profiles that have characteristics of a desired focus group. The organization can also identify individuals having these characteristics who desire to travel to a generally common destination. The organization can then contact the individuals and ask them if they want to participate in the focus group. When a sufficient number of individuals accept, the organization can identify an acceptable date for the focus group and arrange to pickup times for the individuals that can permit the focus group to be implemented and that can be acceptable to the members of the focus group.

In addition to an organization identifying and contacting individuals to be part of a focus group, individuals can include in their profile a preference for ride sharing and can identify one or more individuals or type of individuals with whom they would be interested in ride sharing. Example types of ride pooling groups can include employees of the same business organization, people interested in dating or business networking, people interested in elder or childcare pairing, seniors with a common interest or any other social group. With ride pooling, some individuals may be willing to pay extra to be connected with others in a ride-pooling group.

The systems and methods disclosed herein are directed to a computer technology that can identify activities that an individual or a group of individuals can perform while riding in an AV so that the activities can be completed in the AV and so that the individual or group of individuals can receive a financial reward for completing the activities. The computer technology can also direct the AV to coordinate routes for the individuals, pick up the individuals from different locations, drop off the individuals at different destinations and rearrange trip routes, if necessary, to provide enough time for the individuals to perform the activities while in the AV. The activities can be selected so that a focus group can be formed with individuals having common interests to permit the individuals to interact with each other as they are travelling to their requested destinations. Computer efficiencies can be improved by automatically obtaining and providing activities for which individuals and members of a focus group are interested in and are qualified to review.

Figure 1:
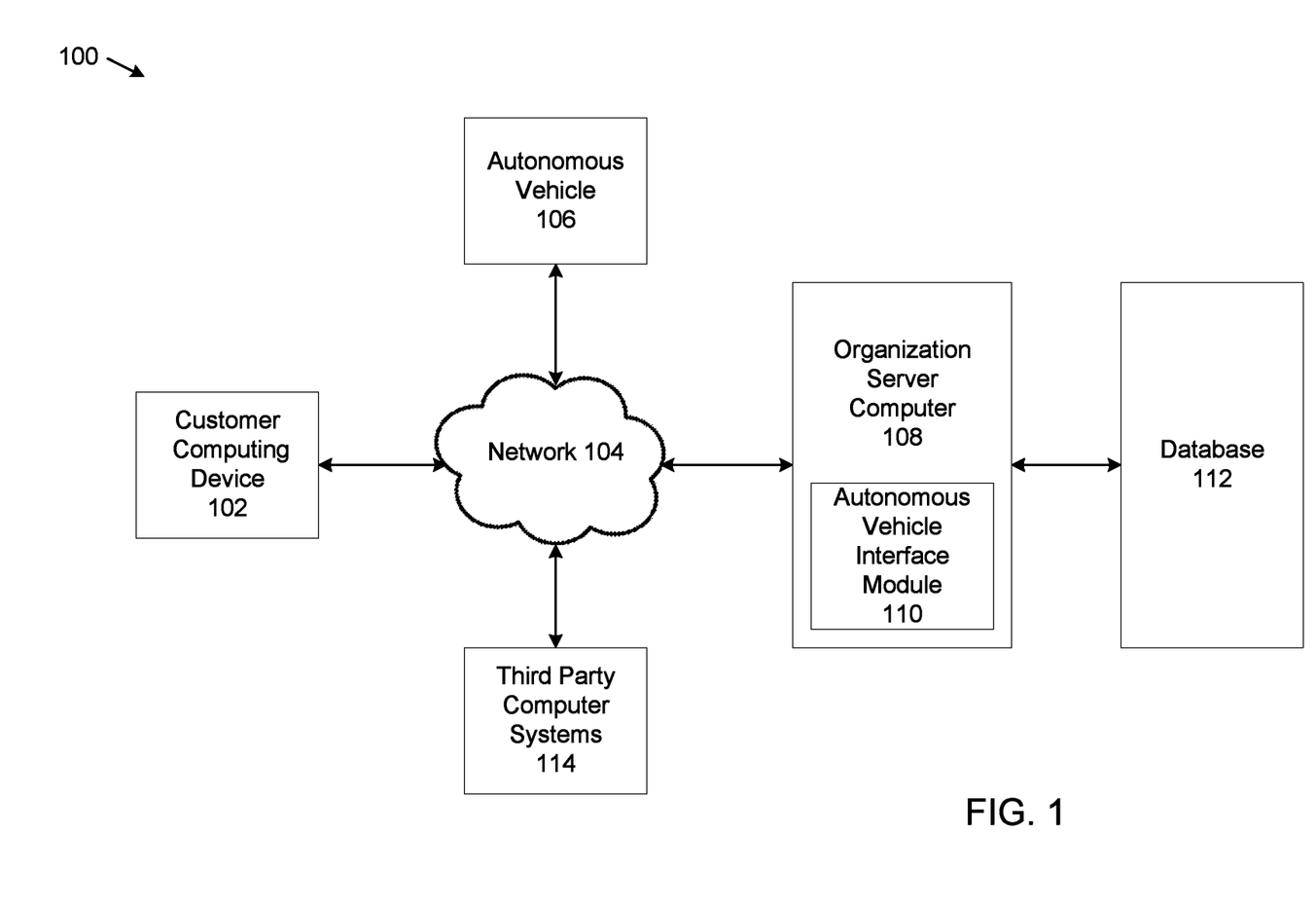
FIG. 1 shows an example system that supports productive use of free time in autonomous vehicles.

FIG. 1 shows an example system 100 that can be configured or programmed to provide activities for productive use of free time in an AV. The example system 100 includes customer computing device 102, network 104, autonomous vehicle 106, organization server computer 108, database 112 and third party computer systems 114. Organization server computer 108 includes autonomous vehicle interface module 110. More, fewer or different components can be used.

The example customer computing device 102 is an electronic computing device of a customer that has a profile with an organization associated with organization server computer 108 or with an organization associated with one or more of third party computer systems 114. Customer computing device 102 is typically a smartphone but it could also include a tablet computer, a desktop computer or a laptop computer. Customer computing device 102 can include a software application for an AV service. The customer can enter his/her profile via the software application and can request an AV via the software application. Typically, each user who has a profile with one of the organizations has at least one customer computing device 102.

The example network 104 is a computer network such as the Internet. Customer computing device 102 and autonomous vehicle 106 can wirelessly connect to or otherwise access organization server computer 108 and third party computer systems 114 via network 104.

The example autonomous vehicle 106 is a self-driving vehicle that can be rented by or owned by the user. Autonomous vehicle 106 includes electronics that permits communication between autonomous vehicle 106 and organization server computer 108 over network 104.

The example organization server computer 108 is a server computer of an organization that can rent AVs to the user or that can process and service a loan for an AV that is owned by the user. Example organizations can include a ride sharing service from which the user can participate in ride pooling in the AV, a car rental company from which the user can rent the AV and a financial institution, such as a bank. The financial institution can have business agreements with the ride sharing service or car rental company or the financial institution can finance a purchase of the AV for the user.

The example autonomous vehicle interface module 110 includes functionality for maintaining a user profile, implementing micro-tasks for the user in the AV, implementing focus groups for users in the AV, providing financial credits to the user for completing tasks in the AV and initiating operations for the AV. The autonomous vehicle interface module 110 is described in more detail later herein.

The example database 112 is an electronic database of the organization associated with organization server computer 108. Profile and financial information for the user can be stored on database 112.

The example third party computer systems 114 are electronic computing devices, typically server computers, of third party organizations that can provide profile and other information about the customer to the organization associated with organization server computer 108. When the organization associated with organization server computer 108 is a ride sharing service, for example Uber, or a car rental company, a third party computer system 114 can comprise a financial institution, such as a bank. The financial institution can provide profile and other information regarding the customer to the ride sharing service or the car rental company.

For the example system 100, autonomous vehicle interface module 110 communicates with the database 112. The database 112 includes profile and financial information for the user. The database 112 can be distributed over a plurality of databases and the autonomous vehicle interface module 110 can be programmed to query (e.g. using SQL) the database 112 to obtain the profile and financial information for the user. For example, database 112 can be queried to obtain the user's home and work address, a user preference regarding ride pooling and a personal calendar for the user.

Figure 2:
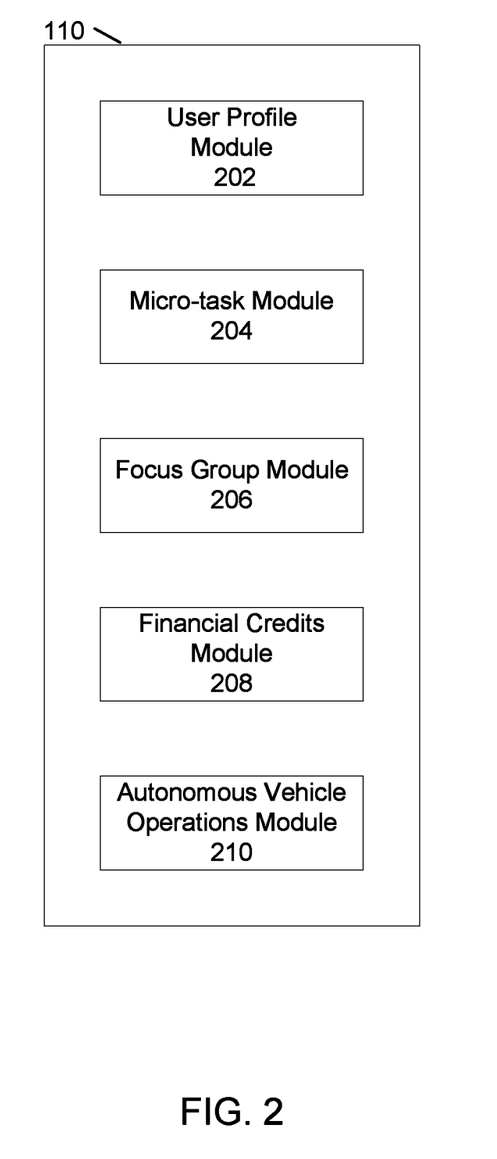
FIG. 2 show example modules of the autonomous vehicle interface of FIG. 1.

FIG. 2 shows example modules of autonomous vehicle interface module 110. The example modules include a user profile module 202, a micro-task module 204, a focus group module 206, a financial credits module 208 and an autonomous vehicle operations module 210. More, fewer and different modules are possible.

The example user profile module 202 maintains a user profile of preferences regarding use of an AV. Example preferences can include whether the user permits ride pooling with others, whether the user is willing to participate in focus groups while riding in the AV and interests that the user may have that can be matched with interests of others. The user profile can also include personal information regarding user such as name, address, telephone number, email address, spouse, age of user and spouse, age of children, employer, employer address, job title and highest educational level. Other user profile items are possible.

The example micro-task module 204 uses information from the user profile to identify and prepare micro-tasks appropriate for the user that can be presented to the user in the AV. Example micro-tasks can be to answer questions regarding an advertisement that can be presented to the user, review a business document, complete a marketing survey, review a product recently purchased by the user, review a website and review hotels and restaurants frequented during a recent vacation trip of the user. Other example micro-tasks are possible. The example micro-task module can also tabulate financial credits earned by the user as a result of completing the micro-tasks.

The example focus group module 206 uses information from the user profile to identify focus groups that the user can participate in while in the AV with other passengers. The focus groups can perform group tasks such as problem solving and brainstorming ideas. The focus group module 206 can identify candidates for the focus group based on common interests and trip destinations similar to those of the user. The focus group module 206 can also present topics for the focus group to members of the focus group and process responses to the topics from the members of the focus group. The focus group module 206 can also coordinate the schedules, pickup locations and destination locations for members of the focus group, determine an amount of time that all members of the focus group have together in the AV and base specific topics and tasks for the focus group on the amount of time available. In some cases, the focus group module 206 can propose an adjustment of the trip route that can permit more time for the focus group to work on the tasks.

The example financial credits module 208 calculates financial credits for the user based on a completion by the user of micro-tasks and focus group activities. Depending on the micro-tasks, the financial credits can be micro-credits that are paid out to the user when a predetermined number of micro-tasks are completed. The financial credits can also be implemented as a reduction of a fare for use of the AV. The reduced fare can be displayed on the display screen of the AV when the predetermined number of micro-tasks are completed. The financial credits can also be used in other ways, such as reducing a loan payment for a user who owns the AV and makes loan payments to the organization. The financial credits can also be applied to a financial account of the user.

The example autonomous vehicle operations module 210 processes information related to the operation of the AV. Example operations include determining availability of AVs to meet trip requests, programming an AV to travel to a specific pickup location at a specific time and rearranging travel routes as necessary. Other operations are possible. In some implementations, for example when the organization associated with organization server computer 108 is a financial institution, autonomous vehicle operations module 210 may be included on a third party computer system 114, for example on a server computer of a car rental company or ride sharing service.

Figure 3:
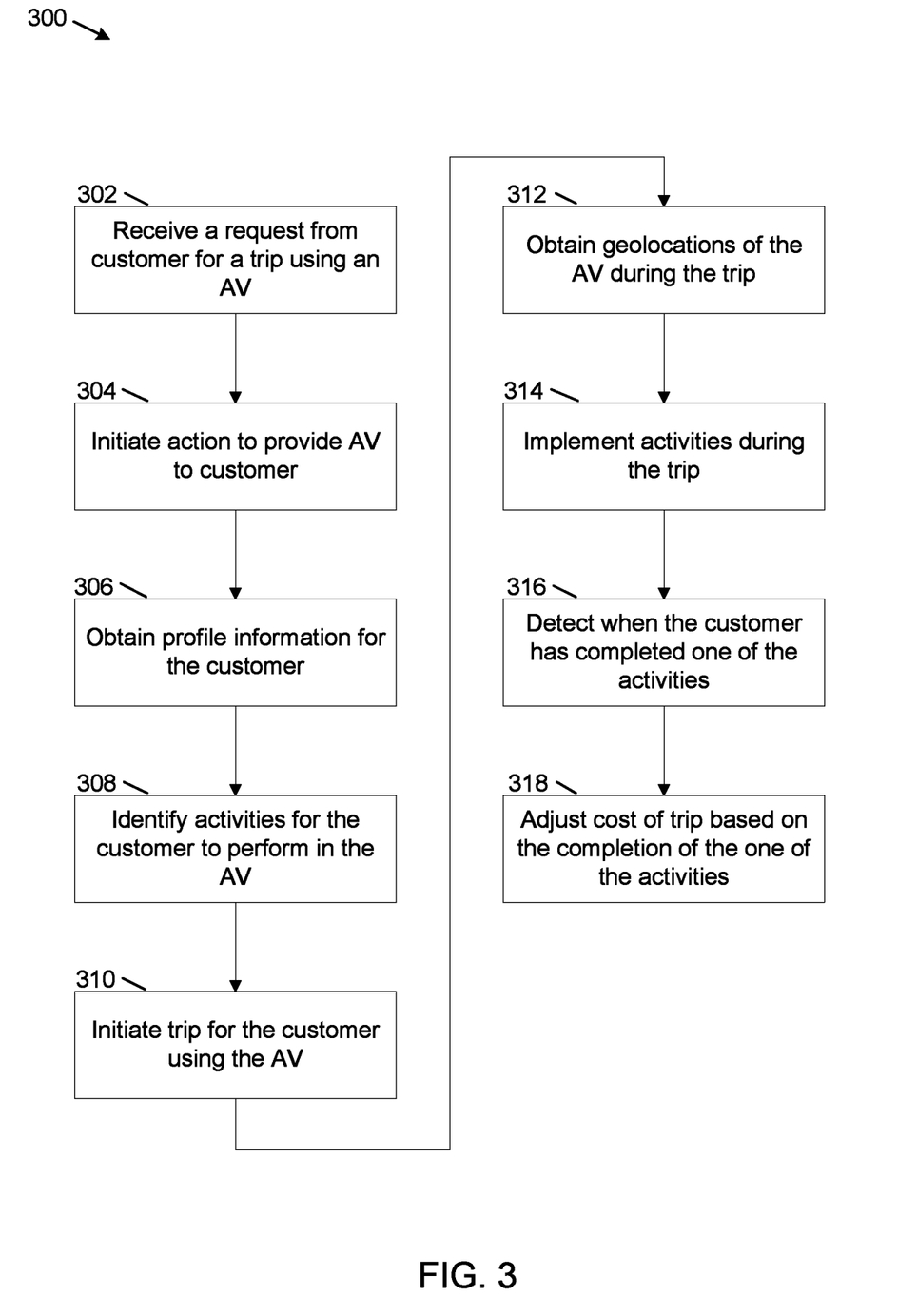
FIG. 3 shows a method for implementing a trip for a passenger in an autonomous vehicle.

FIG. 3 shows a flowchart of an example method 300 for implementing a trip for a user in an AV. For method 300, the user is renting the AV from an AV ride service company and the user does not indicate a preference for ride pooling using the AV. The AV ride service company can have a business arrangement with one or more car rental companies from which the AV ride service company can obtain rental AVs. The AV ride service company can also have business arrangements with third party organizations that may want feedback from the users regarding advertisements and products. Examples of such third party organizations can include advertising companies and marketing organizations. In addition, the AV ride service company can have a business agreement with a financial institution, such as bank, at which the user may have one or more financial accounts. The financial institution can provide profile information regarding the user and can also provide financial institution related tasks that the financial institution may want completed by the user.

At operation 302, the AV ride service company receives a request from a customer for a trip using an AV. The trip request includes a trip destination, a pickup location and a pickup time. For method 300, the AV ride service company has access to a profile of the user that includes trip preferences of the customer. One of the trip preferences indicates that the customer does not want ride pooling.

At operation 304, the AV ride service company initiates an action to obtain an AV for the customer. For example, where the AV ride service company provides AV rental vehicles, the AV ride service company can initiate an action to program an AV to pick up the customer at a location requested by the customer at a time requested by the customer. The action can be to program the AV to arrive at the requested location at the requested time.

At operation 306, profile information is obtained for the user. For method 300, some of the profile information is maintained at the ride sharing company and is obtained from organization server computer 108 or from database 112. In addition, some of the profile information is obtained at a financial institution where the customer has a financial account.

At operation 308, the profile information is used to identify one or more activities for the customer to during a trip in the AV. Example activities can include micro-tasks such as commenting on advertising, providing opinions on products and reviewing documents.

At operation 310, the AV ride service company initiates a trip for the customer using the AV. The trip is to a destination specified in the trip request of operation 302.

At operation 312, as the trip proceeds organization server computer 108 monitors the trip and obtains geolocations for the AV during the trip. The geolocations can be obtained using global positioning system (GPS) software included in the AV.

At operation 314, one or more of the activities identified at operation 308 are presented to the customer and implemented during the trip. In an example implementation, the customer can interact with a user interface of a display screen on the AV to provide feedback for the activity presented to the customer.

At operation 316, organization server computer 108 detects a completion of one of the activities. The completion can be detected based on feedback for the activity provided by the customer or by an elapsed time for the activity.

At operation 318, a cost of the trip is adjusted based on the completion of the activity. For method 300, the cost of a fare for the trip is reduced for each activity completed. A running fare for the trip is displayed on a display screen of the AV. When an activity is completed, the running fare is shown as being reduced on the display screen. For other implementations, a micro-payment can be made when an activity is completed. When a pre-determined number of activities are completed, a sum of the micro-payments made can be credited to a financial account of the customer.

Figure 4:
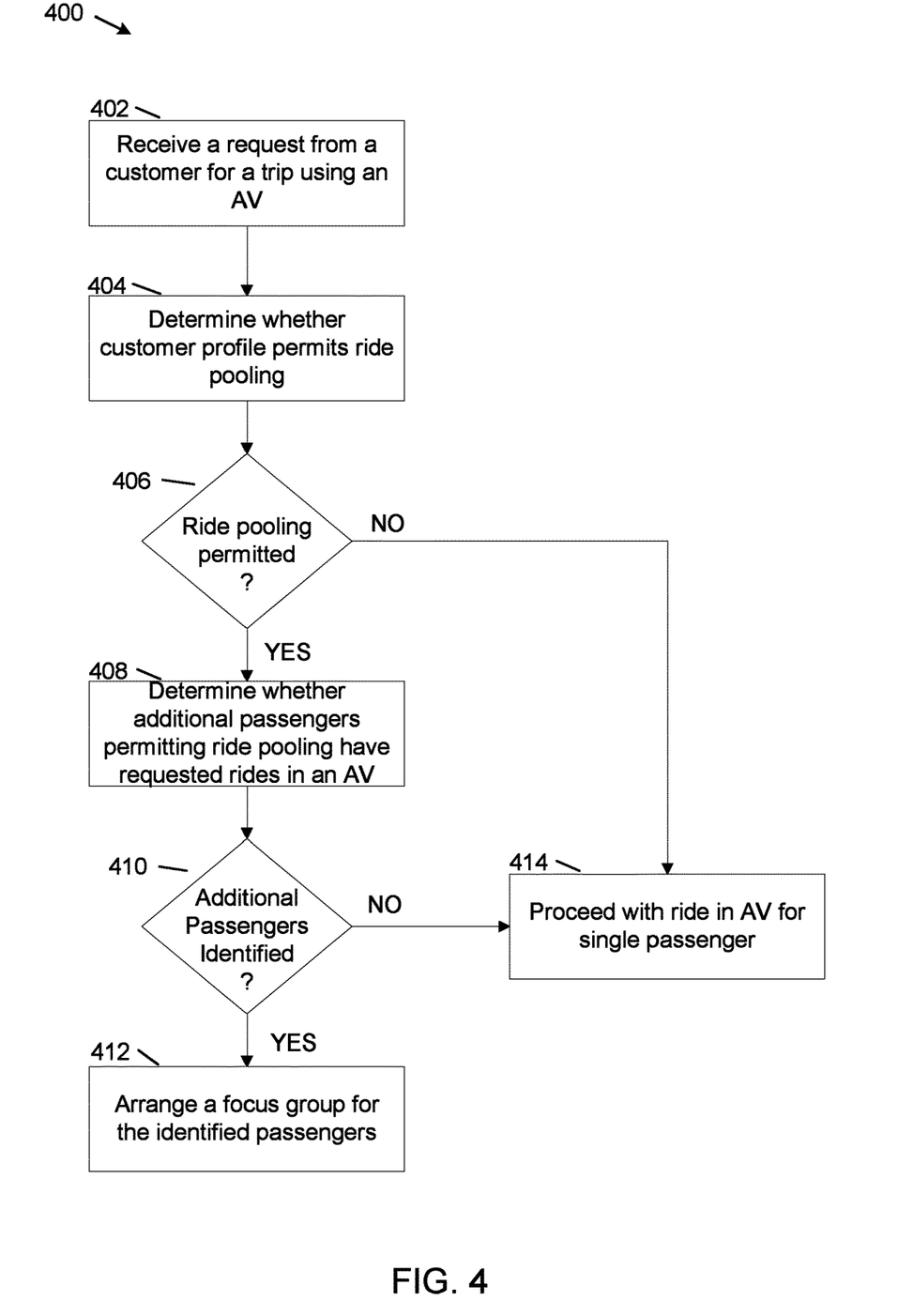
FIG. 4 shows a method for implementing a trip for a plurality of passengers in an autonomous vehicle.

FIG. 4 shows a flowchart of an example method 400 for implementing a trip for a user in an AV for a plurality of passengers.

At operation 402, organization server computer 108 receives a request from a customer for a trip using an AV.

At operation 404, a determination is made as to whether a profile of the customer indicates that the customer permits ride pooling.

At operation 406, when a determination is made that the customer does not permit ride pooling, at operation 414 organization server computer 108 proceeds to implement a ride in the AV for a single passenger. For example, organization server computer 108 can proceed with the operations of method 300, continuing with operation 304.

At operation 406, when a determination is made that the customer does permit ride pooling, at operation 410, a determination is made as to whether additional passengers permitting ride pooling have requested rides in the AV.

At operation 410, when a determination is made that no additional passengers permitting ride sharing are identified, at operation 414, organization server computer 108 proceeds to implement a ride in the AV for a single passenger.

At operation 410, when a determination is made that additional passengers permitting ride sharing are identified, at operation 412, organization server computer 108 arranges a focus group for the identified passengers.

Figure 5:
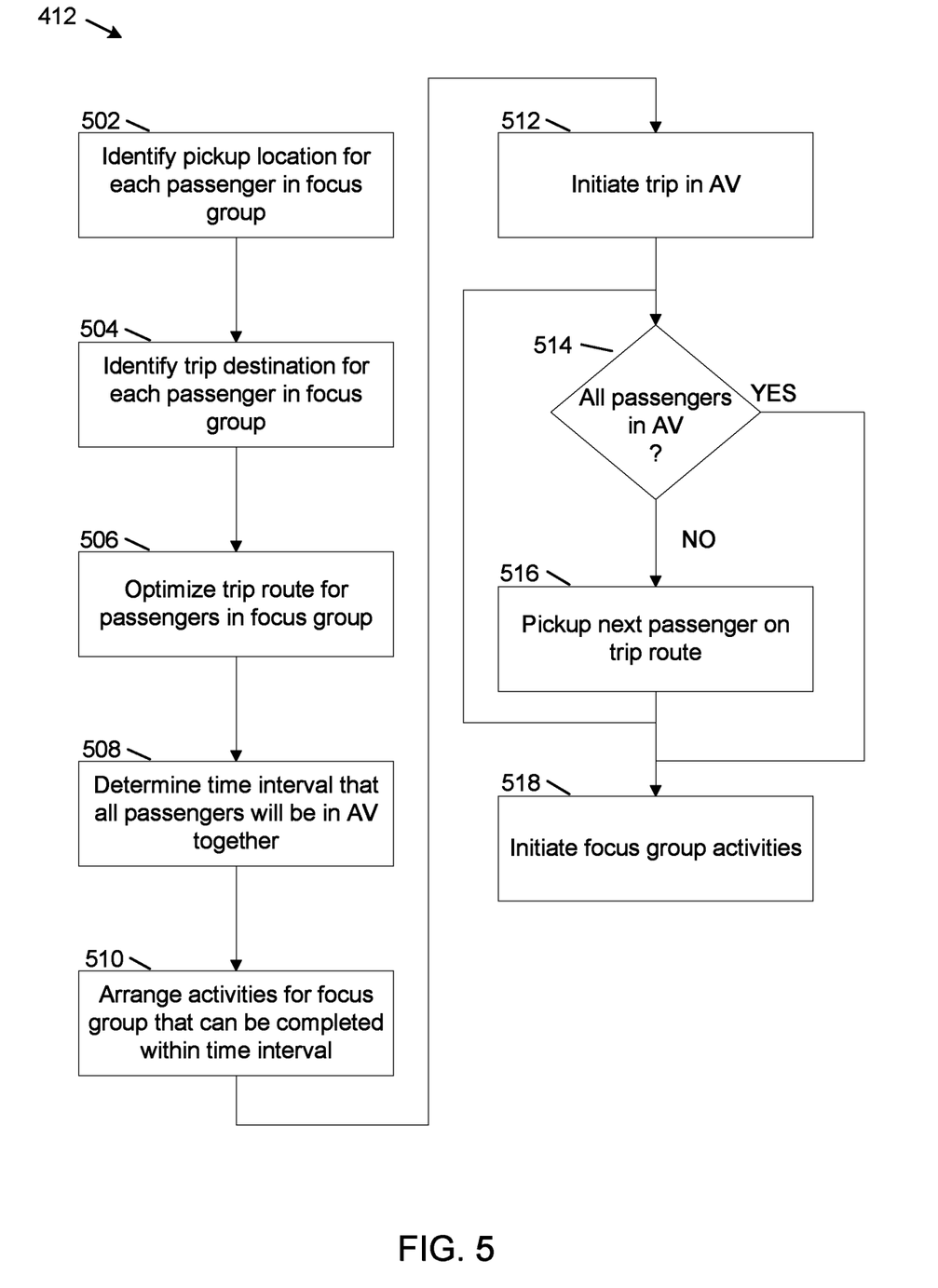
FIG. 5 shows a method for arranging a focus group for the plurality of passengers in the method of FIG. 4.

FIG. 5 shows a flowchart of example operations of operation 412 for arranging a focus group for the identified passengers.

At operation 502, organization server computer 108 identifies a pickup location for each passenger in the focus group. The pickup location is typically provided when each passenger requests a ride in the AV.

At operation 504, organization server computer 108 identifies a trip destination for each passenger in the focus group. The pickup location is also typically provided when each passenger requests a ride in the AV.

At operation 506, organization server computer 108 optimizes a trip route for the passengers in the focus group. The optimization comprises arranging the trip route to pick up the passengers in a sequence that minimizes trip time for the AV.

At operation 508, organization server computer 108 determines a time interval for which all passengers will be in the AV together. The time interval can comprise a time interval from when the last of the passengers enters the AV to when a first of the passengers exits the AV.

At operation 510, organization server computer 108 arranges activities for a focus group that can be completed within the time interval. Organization server computer 108 attempts to select activates for the focus group based on common interests of the members of the focus group. Interests of focus group members can be obtained from profiles of the members of the focus group.

At operation 512, organization server computer 108 initiates a trip in the AV. The AV is configured to travel first to a pickup location of a first passenger on the trip route and then proceed along the trip route until all passengers in the focus group are picked up.

At operation 514, a determination is made as to whether all passengers in the focus group are in the AV.

At operation 514, when a determination is made that all passengers in the focus group are not in the AV, at operation 516, the trip route proceeds until the next passenger on the trip route is picked up.

At operation 514, when a determination is made that all passengers in the focus group are in the AV, at operation 518, organization server computer 108 initiates focus group activities.

There can be various technical advantages associated with the systems and methods described herein. For example, organization server computer 108 can be optimized using autonomous vehicle module 110 to select activities for the user to perform in the AV that are most compatible with the user's profile and that can result in better feedback information for the organization associated with organization server computer 108 and for any other third party organizations that may provide the activities. This can result in an overall system that is faster, uses less computing power and is able to handle an increased number of requests from third party organizations for feedback relating to their products and advertising.

Figure 6:
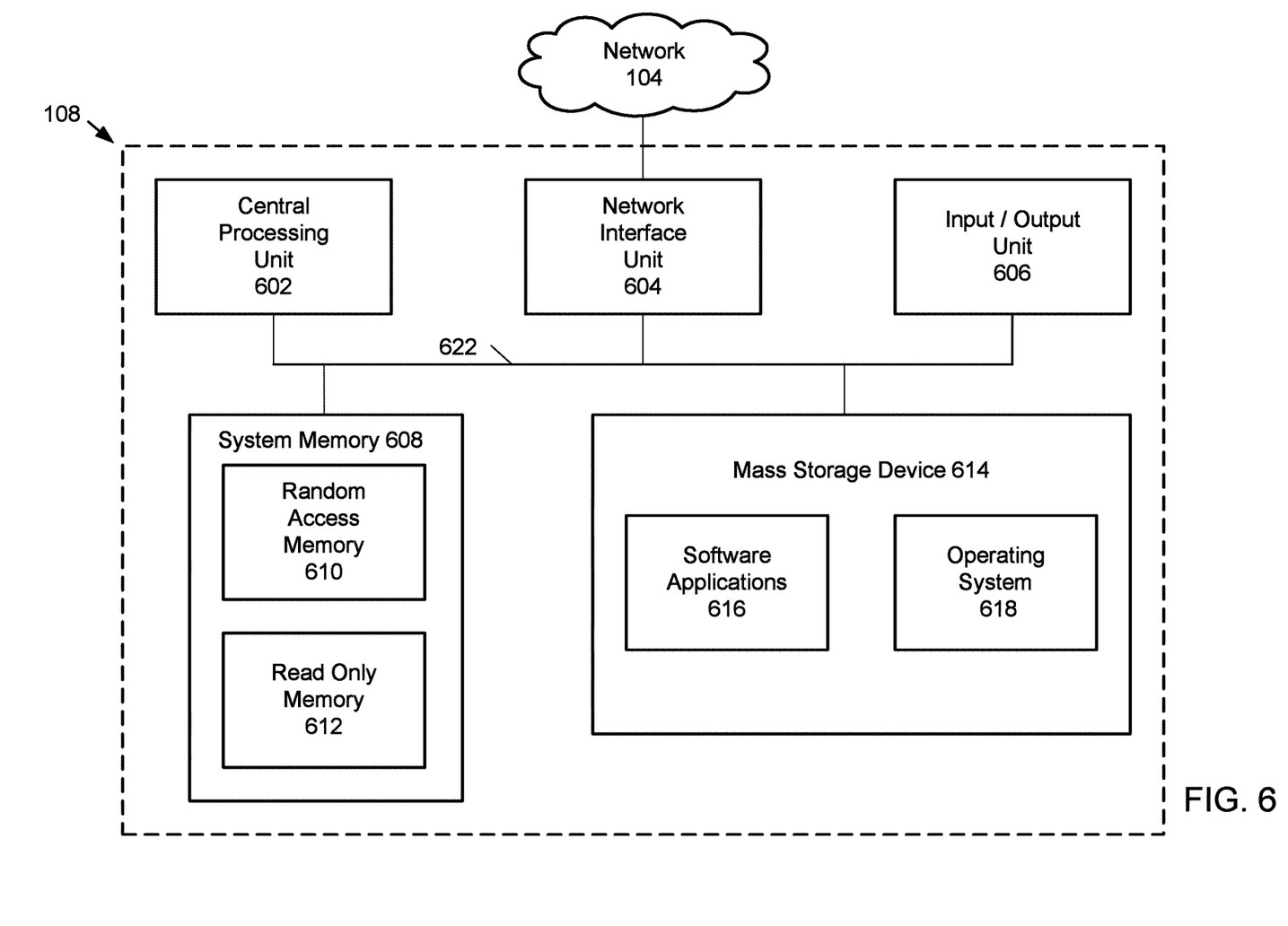
FIG. 6 shows example physical components of the organization server computer of FIG. 1.

As illustrated in the example of FIG. 6, organization server computer 108 includes at least one central processing unit ("CPU") 602, also referred to as a processor, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the organization server computer 108, such as during startup, is stored in the ROM 612. The organization server computer 108 further includes a mass storage device 614. The mass storage device 614 is able to store software instructions and data. Some or all of the components of the organization server computer 108 can also be included in customer computing device 102.

The mass storage device 614 is connected to the CPU 602 through a mass storage controller (not shown) connected to the system bus 622. The mass storage device 614 and its associated computer-readable data storage media provide non-volatile, non-transitory storage for the organization server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the organization server computer 108.

According to various embodiments of the invention, the organization server computer 108 may operate in a networked environment using logical connections to remote network devices through the network 104, such as a wireless network, the Internet, or another type of network. The organization server computer 108 may connect to the network 104 through a network interface unit 604 connected to the system bus 622. It should be appreciated that the network interface unit 604 may also be utilized to connect to other types of networks and remote computing systems. The organization server computer 108 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the organization server computer 108 can store software instructions and data. The software instructions include an operating system 618 suitable for controlling the operation of the organization server computer 108. The mass storage device 614 and/or the RAM 610 also store software instructions and software applications 616, that when executed by the CPU 602, cause the organization server computer 108 to provide the functionality of the organization server computer 108 discussed in this document. For example, the mass storage device 614 and/or the RAM 610 can store software instructions that, when executed by the CPU 602, cause the organization server computer 108 to display received data on the display screen of the organization server computer 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for arranging activities for one or more individuals using an autonomous vehicle (AV), the method comprising:
    on the electronic computing device, receiving a request from a first individual for the AV to provide a trip to a destination;
    in response to receiving the request, autonomously driving the AV along a route to the destination to provide the trip for the first individual;
    using the electronic computing device, monitoring a geolocation of the AV during the trip;
    providing one or more activities for the first individual to perform during the trip using the AV, including:
        obtaining a profile for the first individual;
        accessing a personal calendar of the first individual; and
        selecting the one or more activities for the first individual to perform during the trip based upon the profile of the first individual and the personal calendar of the first individual, the one or more activities including reviewing a document or completing a survey related to the geolocation of the AV during the trip;
    determining that the first individual cannot complete the one or more activities before arriving at the destination;
    sending the document or the survey associated with the one or more activities to other individuals in different vehicles for review or completion;
    permitting the other individuals in different vehicles to collaborate with the first individual on reviewing the document or completing the survey;
    providing an offer of compensation to the first individual for changing a route to the destination in order to provide the first individual with more time to complete the one or more activities during the trip;
    causing the AV to rearrange the route to the destination;
    detecting when the first individual completes one of the one or more activities; and
    adjusting a cost of the trip based on a completion of the one of the one or more activities, wherein adjusting the cost includes reducing the fare for the trip provided by the AV.

2. The method of claim 1, wherein providing the one or more activities for the first individual comprises providing one or more tasks for the first individual to complete during the trip in the AV.

3. The method of claim 1, wherein providing one or more activities for the first individual comprises providing advertising for the first individual to view and interact with during the trip.

4. The method of claim 1, further comprising:
    receiving a request to implement a multi-passenger focus group in the AV;
    directing the AV to a second location of a second individual; and
    after the AV arrives at the second location, providing one or more tasks for the focus group to perform during the trip.

5. The method of claim 4, further comprising: when the AV reaches a trip destination, providing each individual of the focus group with a credit for the cost of the trip.

6. The method of claim 4, further comprising:
    after the AV arrives at the second location, calculating a time interval for a remainder of the trip; and
    selecting the one or more activities for the focus group to perform so that the one or more activities can be completed during the time interval for the remainder of the trip.

7. The method of claim 1, further comprising:
    receive a request from a second individual for a second trip;
    determining from a profile of the first individual and from a profile of the second individual and both the first individual and the second individual have a preference for ride sharing;
    initiating an action to direct the AV to a second location of the second individual so that the second individual can share a ride in the AV with the first individual;
    determining from the profile of the first individual and the profile of the second individual that the first individual and the second individual have a common interest;
    providing topics for discussion to the first individual and the second individual relating to the common interest; and
    receiving responses from one or both of the first individual and the second individual relating to the topics.

8. The method of claim 1, further comprising:
    displaying a current fare for the trip on a display screen in the AV; and
    showing a reduction in the current fare after adjusting the cost of the trip based on the completion of the one or more activities.

9. The method of claim 1, wherein adjusting the cost of the trip comprising reducing a loan payment to the first individual for the AV.

\* \* \* \* \*